United States Patent
O'Brien

(10) Patent No.: US 11,449,146 B2
(45) Date of Patent: Sep. 20, 2022

(54) INTERACTIVE HOLOGRAPHIC HUMAN-COMPUTER INTERFACE

(71) Applicant: Wayne Patrick O'Brien, Stauton, VA (US)

(72) Inventor: Wayne Patrick O'Brien, Stauton, VA (US)

( * ) Notice: Subject to any disclaimer, the term of this patent is extended or adjusted under 35 U.S.C. 154(b) by 0 days.

(21) Appl. No.: 17/060,786

(22) Filed: Oct. 1, 2020

(65) Prior Publication Data

US 2021/0018986 A1 Jan. 21, 2021

Related U.S. Application Data

(63) Continuation-in-part of application No. 16/601,223, filed on Oct. 14, 2019, now abandoned, which is a continuation of application No. 14/736,208, filed on Jun. 10, 2015, now abandoned.

(51) Int. Cl.
*G06F 3/01* (2006.01)
*G03H 1/00* (2006.01)

(52) U.S. Cl.
CPC ........... *G06F 3/017* (2013.01); *G03H 1/0005* (2013.01); *G03H 2001/0061* (2013.01)

(58) Field of Classification Search
CPC ...................................................... G06F 3/017
See application file for complete search history.

(56) References Cited

U.S. PATENT DOCUMENTS

| | | |
|---|---|---|
| 6,031,519 A | 2/2000 | O'Brien |
| 6,377,238 B1 | 4/2002 | McPheters |
| 7,724,407 B2 | 5/2010 | Cadet et al. |
| 8,816,995 B2 | 8/2014 | Geyl |

(Continued)

FOREIGN PATENT DOCUMENTS

| | | |
|---|---|---|
| WO | WO 2005/113399 A1 | 12/2005 |
| WO | WO 2013/093837 A1 | 6/2013 |

OTHER PUBLICATIONS

Any identified foreign patents and/or publications were properly submitted in parent U.S. Appl. No. 14/736,208, filed Jun. 10, 2015, the priority of which is claimed.

*Primary Examiner* — William Boddie
*Assistant Examiner* — Andrew B Schnirel
(74) *Attorney, Agent, or Firm* — Nath, Goldberg & Meyer; Richard C. Litman

(57) ABSTRACT

The interactive holographic human-computer interface (H2CI) includes a local system in communication with an external system, and a holographic display unit for constructing and displaying one or more holograms. The one or more holograms emits electromagnetic radiation. The interface further includes a motion detector for detecting motion, type of motion, dwell time, and location of a physical command object relative to the displayed hologram, and sensors on the external system to determine the location of two or more physical objects relative to each other. Emission and detection by the one or more displayed holograms of electromagnetic radiation is used to simulate electrical, vibration, or other physical phenomena characteristic of the physical objects represented by the one or more displayed holograms. The emitted electromagnetic radiation is converted into a command signal when the electromagnetic radiation is detected by another hologram.

15 Claims, 9 Drawing Sheets

(56) References Cited

U.S. PATENT DOCUMENTS

| | | | |
|---|---|---|---|
| 8,847,919 B2 | 9/2014 | Krah | |
| 2005/0002074 A1* | 1/2005 | McPheters | G03H 1/0005 |
| | | | 359/15 |
| 2005/0128184 A1 | 6/2005 | McGreevy | |
| 2008/0231926 A1* | 9/2008 | Klug | H04N 13/327 |
| | | | 359/23 |
| 2008/0297590 A1* | 12/2008 | Barber | H04N 13/383 |
| | | | 348/47 |
| 2009/0109175 A1 | 4/2009 | Fein et al. | |
| 2009/0109176 A1 | 4/2009 | Fein et al. | |
| 2009/0184851 A1 | 7/2009 | Grego et al. | |
| 2011/0107270 A1* | 5/2011 | Wang | G16H 20/40 |
| | | | 715/850 |
| 2011/0128555 A1* | 6/2011 | Rotschild | G02B 30/50 |
| | | | 356/625 |
| 2011/0191707 A1* | 8/2011 | Lee | G09G 5/00 |
| | | | 715/765 |
| 2012/0005624 A1 | 1/2012 | Vesely | |
| 2012/0038547 A1 | 2/2012 | Fein et al. | |
| 2014/0206418 A1* | 7/2014 | Kim | G03H 1/26 |
| | | | 455/566 |
| 2014/0282008 A1* | 9/2014 | Verard | G03H 1/00 |
| | | | 715/728 |
| 2014/0358002 A1* | 12/2014 | Daoura | A61B 8/467 |
| | | | 600/443 |

\* cited by examiner

INTERACTIVE HOLOGRAPHIC HUMAN-COMPUTER INTERFACE

CROSS REFERENCE TO RELATED APPLICATIONS

This application is a continuation-in-part of Ser. No. 16/601,223, filed Oct. 14, 2019, now pending, which is a continuation of Ser. No. 14/736,208, filed Jun. 10, 2015, abandoned.

BACKGROUND OF THE INVENTION

1. Field of the Invention

The present invention relates to human-computer interfaces, and particularly to an interactive holographic human-computer interface (H2CI) that couples motion detection and/or emission and detection of electromagnetic radiation (EMR) with a holographic display for providing a three-dimensional, interactive interface for controlling both local and external systems or devices, referred to collectively as a system, A system may be the one in which the H2CI is running (the local system), an external system, either locally located (including one in which the local system is embedded) or remotely located, e.g., a robot or factory (FIG. 6).

2. Description of the Related Art

Holographic interfaces for computers and the like are known. FIGS. 2 and 3 show an exemplary prior art holographic direct manipulation interface for enabling a user to input commands to a computer and display the desired output. As shown in FIG. 2, user 15 sits in front of a three-dimensional displayed hologram 25 positioned near a corresponding central processing unit (CPU) 10 or the like, which is in communication with a motion detector 35. The motion detector 35 monitors the location of a "Command Object" 17, such as the user's finger.

As shown in FIGS. 2 and 3, the prior art computer input system allows the user 15 to input a command to a computer 10 via a holographic display 25 or hologram by moving his or her finger to a location on the hologram. This location, referred to as a "command point" 27, is best shown in FIG. 3. The CPU 10 stores data that enables a holographic display unit 30 to generate a hologram 25. A motion detector 35 detects the movement of a Command Object 17. The Command Object 17 whose motion is detected may alternatively be designated as a finger on the user's hand or any other passively movable object, such as a pointer stick. The Command Object 17 may also transmit a signal or ray to the motion detector 35. CPU 10 compares the movement, type of movement, dwell time, and location of the Command Object 17 to the command points 27 to determine whether a command is being selected by the user 15. When the Command Object 17 passes within a threshold distance of a command point 27, remains for a predetermined dwell time, and/or performs a contact code, the selected command is performed.

When the computer is started and operating, a hologram 25 that is similar to the screen of a graphical user interface (GUI) is displayed before a user, but the display is in three dimensions. There is no monitor or other conventional display interface physically present; i.e., the conventional computer GUI is replaced by a holograph 25 that displays information. The hologram is projected in midair from a holographic display unit 30. As best seen in FIG. 3, the holographic display unit 30 displays three-dimensional objects, menu selections, and/or data points in all three dimensions, and this constitutes the hologram 25.

The user 15 is presented with a multitude of command points 27 in, on, and around the hologram 25 from which he or she can choose. The user 15 selects a command point 27, which is displayed as an object, menu selection, or data point in the three-dimensional display area. The Command Object 17 (the user's finger in the example of FIG. 3) is controlled by the user 15, and it is the instrument that enables the user 15 to communicate with the computer. The user 15 chooses where the Command Object 17 travels and the command points 27 desired to be selected. The user 15 moves the Command Object 17 to within a minimum threshold distance of a command point 27 or performs a "contact code" to choose a command. After a predetermined period programmed into the computer during which the Command Object is detected by the motion detector in that location, the command is initiated.

FIG. 3 displays an enlarged and detailed view of the hologram 25 and user 15 using his or her finger as the Command Object 17 to designate a command by moving the finger within a threshold distance of the command point 27. An object is designated as the Command Object 17 by user 15. The location of the Command Object 17 is continuously monitored by the motion detector 35. The Command Object's three-dimensional location is continuously sent as output signals to CPU 10 by the motion detector 35. The CPU 10 compares the location of the Command Object 17 to the stored data locations of displayed command points 27 in, on, and around the hologram 25 that is presently displayed. Moving the Command Object 17 within a minimum threshold distance of a displayed command point 27 on the hologram selects the command. The command selected by the user depends upon the command points 27 that are displayed in, on, or around the hologram and on which command point 27 the user moves his or her Command Object 17 within a minimum threshold distance of.

Predetermined sequences of motion are stored in the CPU 10, and these are referred to as "contact codes". The locations of the Command Object 17 are monitored by the processor to determine whether a contact code is performed by it. For example, a tapping motion on or near a command point 27, similar to double-clicking with a mouse, indicates a command is sought to be implemented by the user 15.

The CPU 10 receives the signals that represent the location of the Command Object 17 and computes the distance between the Command Object 17 and command points 27. The three-dimensional coordinates of all currently displayed command points 27 in, on, and around the hologram 25 are saved in the CPU 10. The saved locations of each command point 27 are continuously compared to the locations sent to the CPU 10 by the motion detector 35. When the proximity of the Command Object 17 is within a minimum threshold distance of the location of a command point 27 and over a predetermined period of time, the CPU 10 performs the chosen command.

Parallel processing is performed by the CPU 10 to determine whether the Command Object 17 has also performed a contact code. The processor saves the signals representing the locations of the Command Object 17 for a minimum amount of time. Motions by the Command Object 17 within the predetermined time are compared to contact codes to determine whether there is a match. The location of the performance of a contact code and its type is monitored to correlate it to the desired command. When the CPU 10 determines that a contact code has been performed the type of contact code and whether it was performed within a minimum threshold distance of a command point 27 is determined. The type of contact code, whether it was performed within a minimum distance of a command point 27 and what command point 27 it was performed at, enables the CPU 10 to compare these factors with predetermined codes to determine the command desired. After the desired command is determined, a command signal is sent to the CPU 10 to implement the desired command.

Such holographic interfaces are known in the art. One such system is shown in my prior patent, U.S. Pat. No. 6,031,519, issued Feb. 29, 2000, which is hereby incorporated by reference in its entirety. Such systems, though, are typically limited to acting as simple computer interfaces, e.g., substituting for a keyboard, mouse, etc. associated with a conventional personal computer. Thus, it would be desirable to:

provide the convenience, efficiency, and combined data display and input interface of a holographic display for physical controls (virtual controls) for external systems connected to the local system, which require manipulation by the user for sending control signals or other information (e.g., feedback data) to the external system, including power plants, processing plants, planes, ships, vehicles, or external software systems (such as simulations), either remotely or locally located;

provide virtual objects to interact (e.g., exchange information) with each other about more than location detection.

provide sensor feedback to determine (in realtime, under computer control) the actual location of the physical object relative to the targeted physical object;

provide virtual objects (e.g., a holographic representation of a physical control) to control a physical system;

provide a holographic interface that would distinguish the type of motion of a physical object (e.g., the Command Object) relative to a virtual object (e.g., a representation of a control) to allow distinguishing intended from unintended motions in realtime in addition to the location and dwell time of the physical and virtual objects relative to each other;

provide a holographic interface that would distinguish the type of motion of physical objects (e.g., a tool or instrument and a target object) relative to each other and virtual objects relative to each other (e.g., a virtual tool relative to a virtual target);

provide a holographic interface that supports multiple applications similar to the conventional human-computer interfaces support any application that is developed for the computer, including the control of external (local or remote) systems, without having to develop the holographic interface separately for each application;

provide standard shapes and pictures are available for today's presentation applications, standard holographic images would be provided. In the case of drawing new shapes or pictures, as in drawing or design applications, the results would be displayed as holograms, with automated assistance, by providing standard elements such as lines, curves, surfaces, and solids;

provide the convenience, efficiency, combined data display and input interface of virtual controls (displayed as holograms) for local systems or for external systems connected to a local system by sending control signals or other information (e.g., feedback data) to the external system based on manipulation of the virtual controls; wherein the external system could be power plants, processing plants, planes, ships, vehicles, or external software systems (such as simulations), either remotely or locally located;

provide sensor feedback (in realtime, under computer control) to allow a virtual object (e.g., a virtual tool or instrument) that targets a virtual representation of a physical object to be used to manipulate a physical object (e.g., a tool or instrument) to act on another physical object that corresponds to the target virtual representation of the physical object; and provide displayed holographic objects (both targets and instruments or tools) to emit and detect electromagnetic radiation (EMR) to and from other displayed holographic objects, and/or allow the Command Object to emit and detect EMR, for purposes of conveying and detecting information among displayed holographic objects, and/or the Command Object, independently of the motion detector; thus, the built in EMR would function as sensors.

Thus, an interactive holographic human-computer interface to solve the aforementioned problems and provide the desired interfaces is desired.

SUMMARY OF THE INVENTION

The interactive holographic human-computer interface includes, in an exemplary recitation, a holographic display unit for constructing and displaying a hologram and a motion detector for detecting movement and location of a physical Command Object, such as a user's finger or hand, relative to the displayed hologram. The motion detector is in communication with a controller for converting the detected location of the physical Command Object relative to its position with respect to the displayed hologram into a command signal. The command signal is then used to control the computer or transmitted to an external system, such as a robotic arm in a remote place. The hologram may be a representation of the physical controls of the external system. As a further example, the holographic interface for manipulation may be used locally or onboard for controlling a vehicle. Some of the features will provide:

1. Support for multiple applications just as today's human-computer interfaces support any application that is developed for the computer, including the control of external (local or remote) systems, without having to develop the holographic interface separately for each application. In the same manner that standard shapes and pictures are available for presentation applications, standard holographic images would be provided. In the case of drawing new shapes or pictures, as in drawing or design applications, the results would be automatically displayed as holograms, with automated assistance by providing standard elements such as lines, curves, surfaces, and solids.

2. Provision of the convenience, efficiency, combined data display and input interface of virtual physical controls (displayed as holograms) for the local system or for external systems connected to the local system (see FIG. 6 and FIG. 9), including an external system into which the local system is embedded. Such controls would require manipulation by the user for sending control signals or other information (e.g., feedback data) to the external system, including power plants, processing plants, planes, ships, vehicles, or external software systems (such as simulations), either remotely or locally located. Such virtual controls would enable the user to control the external system directly, rather than indirectly through manipulation of virtual objects controlling applications within the external system. For example, the command signal may be a command for the external system to perform an act corresponding to manipulation of the holographic image of a physical control (virtual control) by the Command Object, using, as appropriate, holographic representations of levers, buttons, dials, and wheels) or other physical controls.
3. Interaction with displayed holograms (virtual objects), not just the virtual physical controls, as the actual interface to the local or external system, would also result in changes to the system being controlled, not just in the displayed holograms.
4. Use of sensor feedback (in realtime, under computer control) to allow a virtual object (e.g., a virtual tool or instrument that targets another virtual object) to be used to manipulate a corresponding physical object (e.g., a tool or instrument located remotely) to act on a target physical object corresponding to the target virtual object (FIG. 9). Detecting and emitting EMR would be a form of sensor feedback (see 6 below).
5. A holographic interface that would distinguish the type of motion (e.g., back and forth vs. rotation, in realtime, under computer control) of physical objects (e.g., a physical tool, instrument or the Command Object) relative to each other and virtual objects, in addition to their motion, location and dwell time relative to each other and virtual objects (e.g., FIG. 3 and FIG. 5). Distinguishing type of motion would allow gestures in the H2CI analogous to those used with touch, motion, and image sensitive screens, as well as ensuring accurate interpretation of manipulation of virtual controls. The type of motion could be used to manipulate virtual objects (e.g., FIG. 3 and FIG. 5) with continuous gestures (e.g., continue rotating as long as user continues moving the Command Object in the same direction) rather than discrete contact codes. Command points would be similar to handles on objects in current drawing programs that allow a particular action (increase or decrease size, rotate, or move) to be performed as long as contact with the handle and motion are continued.
6. Emission and detection, probably of light pulses or other electromagnetic radiation (EMR) FIG. 9, of simulated electrical, vibration, or other physical phenomena characteristic of the physical objects represented by the displayed holograms. This would permit displayed holographic objects (both targets and instruments or tools) to emit and detect EMR to and from other displayed holographic objects for purposes of conveying and detecting information among displayed holographic objects. Such emitted information might, for example, reflect the physical characteristics of the physical object represented by a displayed hologram, possibly for virtual targets too large for the motion detector setup, which could be detected by virtual controls (FIG. 9). Another exemplary embodiment would allow the proximity of one virtual object to another to be determined without the motion detector. Such emission and detection of EMR would also support haptic feedback and virtual reality applications, including use by the Command Object. The built in EMR could perform the function of sensors FIG. 9.

The motion detector is in communication with a controller in realtime without human intervention for converting the detected motion, type of motion, location, and dwell time of the physical and virtual objects relative to each other into a command signal. The command signal is then used to control the local system or transmitted in realtime without human intervention to an external system, such as a robotic arm in a remote plant, another computer controlling a remote system, or a simulation running in another computer. Further, emission and detection of EMR would permit the exchange of information among virtual objects in addition to their proximity to each other and/or the Command Object or beyond the physical capacity of the motion detector configuration, independently of the motion detector.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
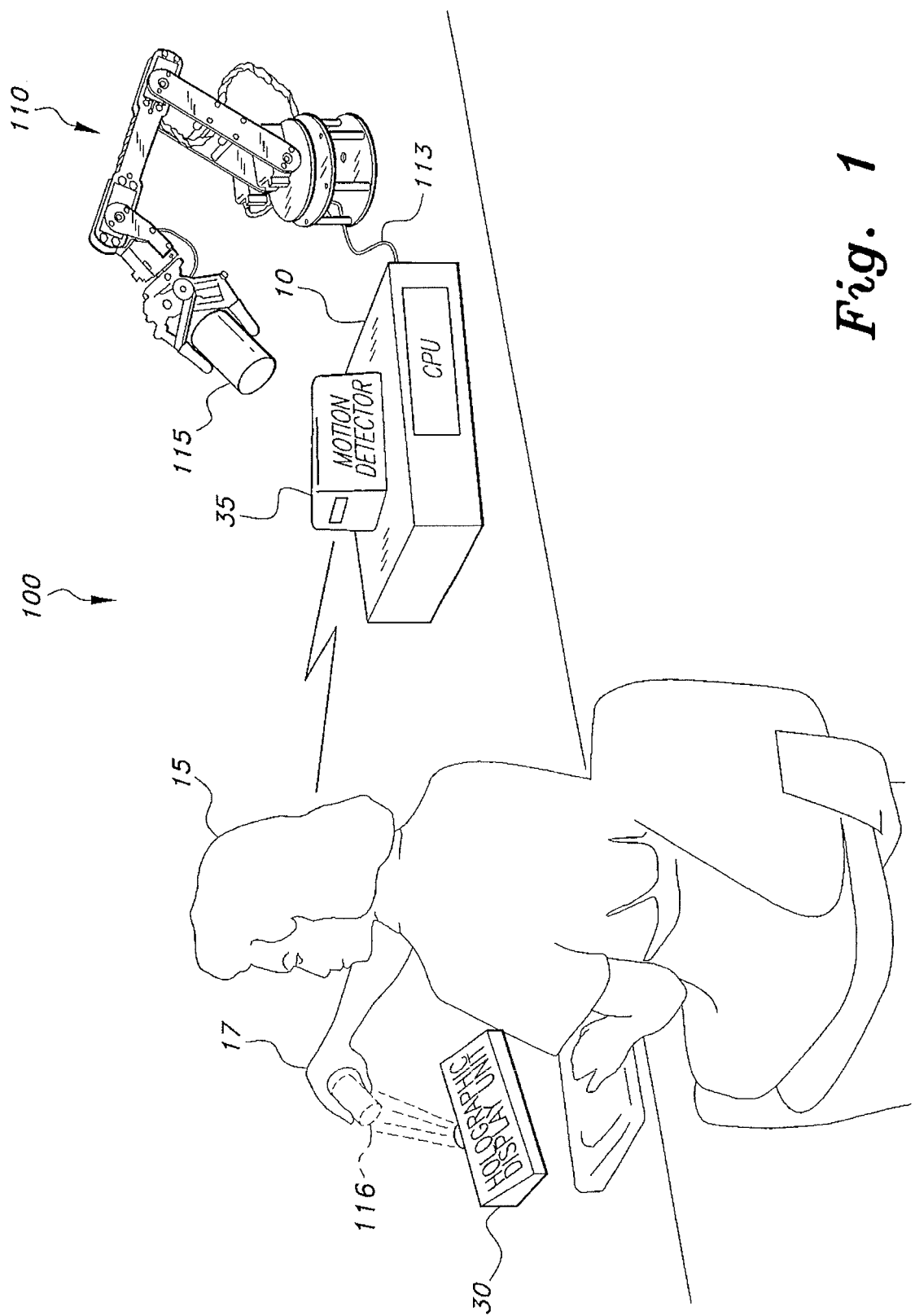
FIG. 1 is an environmental, perspective view of a holographic interface for manipulation according to the present invention.

A shown in FIG. 1, the holographic interface for manipulation 100 operates in a manner similar to the prior art system described above and shown in FIGS. 2 and 3, including holographic display unit 30, motion detector 35 and CPU 10. However, the CPU further communicates with an external system 110. In the example shown in FIG. 1, the external system 110 is a conventional robotic arm gripping a physical object, e.g., a cup 115. The holographic display unit 30 projects a holographic image 116, representative of the physical object 115, and the user's hand serves as the Command Object 17, as described above, to manipulate the holographic image 116. The CPU 10 interprets motion of the Command Object 17 (i.e., the user's hand) with regard to the holographic image 116, as described above with relation to FIGS. 2 and 3, to transmit a command signal to the robotic arm 110 for real, physical manipulation of the physical object 115. The hologram may be a representation of the physical controls of the external system (or a simulation thereof), e.g., a control panel, a cockpit, a remote control device, etc., and the holographic image 116 being manipulated by the Command Object 17 may be a physical control, e.g., a steering wheel, a button on a remote control, a switch, or other physical control of the external system. In FIG. 1, the CPU 10 is shown as being in communication with robotic arm 110 by a wired line or Ethernet cable 113. However, it should be understood that the CPU 10 may transmit control signals to and receive feedback signals from the external system 110 by any suitable transmission path, including wired or wireless transmission. It should be understood that the external system may be any suitable external system, e.g., a computer, computer system or the like for interpreting control signals and delivering control commands for the external system or, alternatively, for interpreting control signals for a computerized simulation of an external system.

The holographic interface for manipulation 100 controls CPU 10 a manner similar to a conventional computer interface (monitor, keyboard, mouse, etc.), exchanging interface command signals with the CPU 10. The CPU 10 then, in turn, may transmit command and control signals to an external system or system. It should be understood that the external system may be any type of external system, including a computer, as will be described in greater detail below.

In addition to motion detection, it should be understood that any suitable type of auxiliary control interface, as is conventionally known, may be integrated into the system, such as speech or voice recognition hardware and/or software; conventional computer interfaces such as keyboards, mice, etc.; wireless remote control signals, or the like. Thus, auxiliary control signals by any additional type of controller or interface may also be used and transmitted to the external system.

Figure 4:
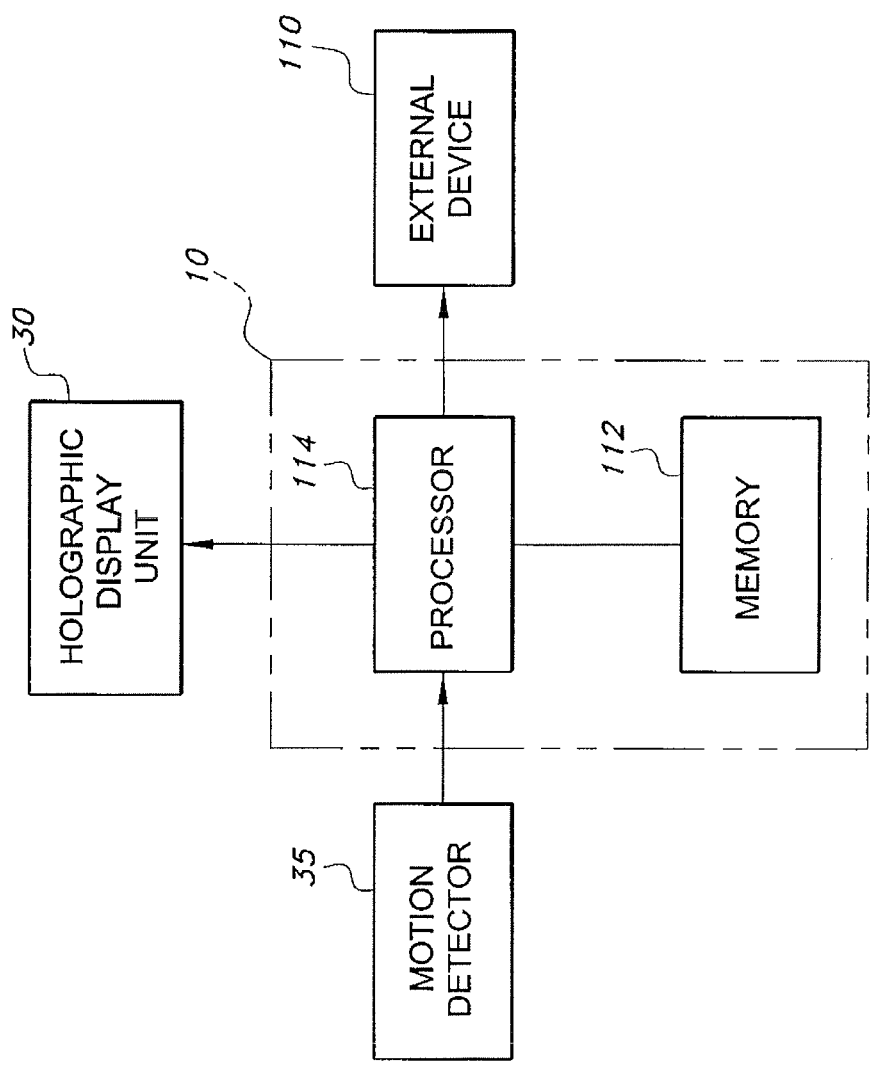
FIG. 4 is a block diagram illustrating system components of the holographic interface for manipulation according to the present invention.

It should be understood that the CPU 10 may be part of or replaced by any suitable computer system or controller, such as that diagrammatically shown in FIG. 4. Data is entered via the motion detector 35 communicating with the CPU 10, as described above, and may be stored in memory 112, which may be any suitable type of computer readable and programmable memory, which is preferably a non-transitory, computer readable storage medium. Calculations are performed by a processor 114, which may be any suitable type of computer processor. The processor 114 may be associated with or incorporated into any suitable type of computing system, for example, a personal computer or a programmable logic controller. The motion detector 35, the processor 114, the memory 112, the holographic display unit 30, the external system 110, and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk system (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

Figure 5:
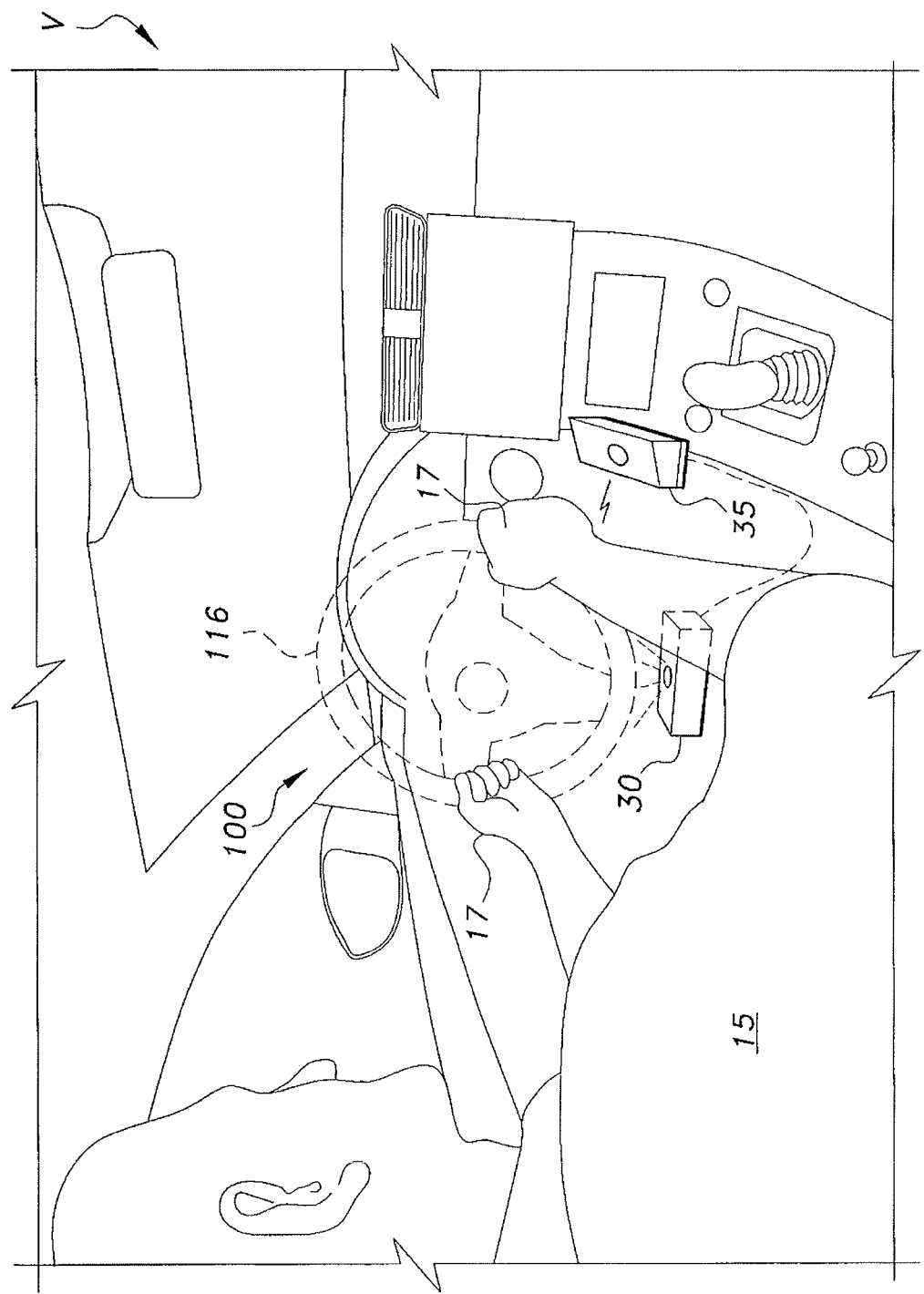
FIG. 5 is an environmental, perspective view of an alternative embodiment of a holographic interface for manipulation according to the present invention.

It should be understood that the robotic arm shown in FIG. 1 is shown for exemplary purposes only, and that the holographic interface for manipulation 100 may be used to control any remote system (such as the robotic arm of FIG. 1, or any other type of machinery that may be used in a remote plant or external software system such as a simulation) or to replace local or onboard controls or interfaces. As a further example, FIG. 5 illustrates local system 100 can be embedded in an external system, in this case a vehicle V, the holographic display unit 30 being mounted within the vehicle's cabin for projecting the holographic image 116, which is in the form of a steering wheel in this example. The motion detector 35 is similarly mounted within the vehicle's cabin for detecting the user's manipulation of the holographic steering wheel image 116. As shown, the user may use his or her hands in a conventional steering manner, so that the hands serve as the Command Objects 17 such that the motion detector 35 will detect the user's conventional steering movements with respect to the holographic steering wheel image 116. The motion detector 35 transmits the received motion signals to the CPU 10, which may be mounted in any suitable location within vehicle V for transmitting control signals to the external system 110, which, in this example, is the vehicle's steering system. The CPU 10 may discriminate between general motions made by the Command Objects 17 (i.e., the user's hands in this example) and motions specific to the steering of a vehicle. For example, if the user makes back-and-forth linear motions with his or her hands, the CPU 10 will not interpret this as steering-related and will not transmit a control signal to the vehicle's steering system. The CPU 10 can be programmed to only interpret clockwise or counter-clockwise rotational movement of the user's hands as steering-related, and only transmit a control signal when such motion is detected by the motion detector 35, for example.

It should be understood that FIGS. 1 and 5 only illustrate examples of the use of the holographic interface for manipulation 100, and that the holographic interface for manipulation 100 may be used as an interface for any suitable system, including remote systems, such as remote plants, or local or onboard systems, such as the exemplary vehicle V of FIG. 5, or as a further example, a fighter jet. In a more complex system, such as a fighter jet, the holographic display unit 30 could be used to project fighter jet controls to be manipulated by the user, as well as heads-up holographic information. The CPU 10 may be in communication with information systems associated with the jet, such as radar signal processing systems and the like. It should be understood that in addition to on-board control, such as in vehicle V or in the example of a fighter jet, the holographic interface for manipulation 100 may also be used in conjunction with a mock-up for purposes of training or simulation.

It should be further understood that the holographic interface 100 is not limited to the control of external systems, but may also be used as a direct interface for a computer, computer system, computer network or the like. The holographic interface 100 allows the user to interact with holograms of objects of interest directly, for viewing, arranging for design purposes, editing and the like, particularly for applications running on the computer, including conventional computer applications, simulations and the like.

Further, it is important to note that the holographic interface for manipulation 100 provides the user with the capability to directly manipulate holograms that represent controls on systems, whether physical or not, that are external to the computer running the interface. For example, in FIG. 1, the user is not manipulating a hologram of the robotic arm 110, but is rather manipulating a hologram of the object 115 being manipulated by the robotic arm. This is one use of the system, whereas the example of FIG. 5 illustrates another use, where the user manipulates a hologram of the controls of the external system (a vehicle in this example). It should be further understood that the external system may be another computer or computerized system, such that the external control corresponds to external software control, thus forming a remote computer interface.

It should be further understood that the remote system, such as the exemplary robotic arm 110 of FIG. 1, may include sensors, transmitters or any other necessary or desired auxiliary or peripheral equipment, or may be in communication with such at the remote location. Using the example of FIG. 1, as the user's hand 17 moves toward the hologram of the object 116, the robotic arm 110 moves toward the actual object 115. In addition to system 100 tracking the relative location of the user's hand 17 via sensor 35, additional external sensors may be used to track the location of the hand 17 (or some other Command Object) relative to both the position of the robotic arm 110 and the physical object 115, as well as translating the hand movements into actual physical pressure on the object 115.

Figure 6:
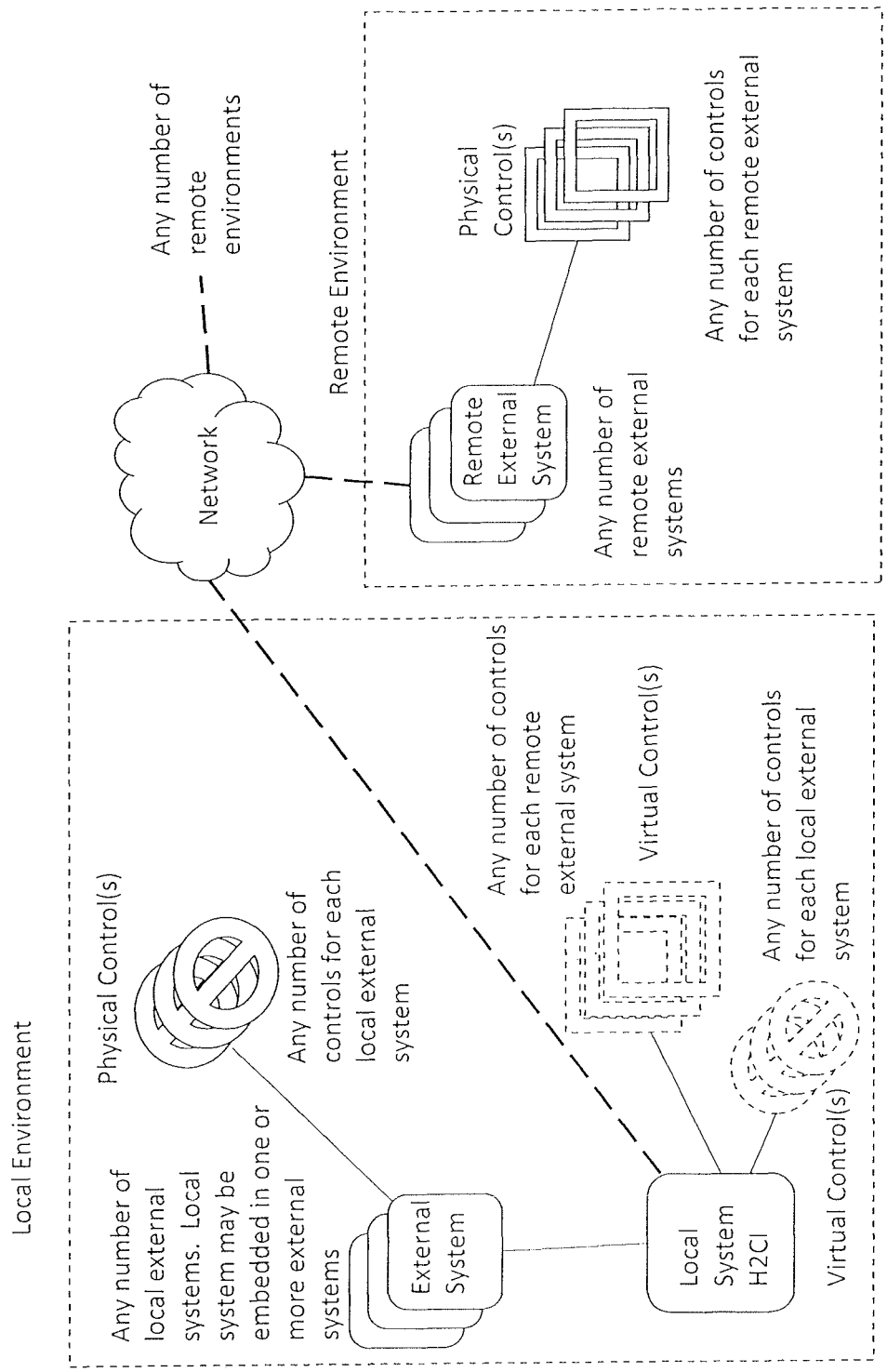
FIG. 6 is an environmental, perspective view of an alternative embodiment of an H2CI according to the present invention showing a local system linked to one or more external systems located both locally and in one or more remote locations
Figure 9:
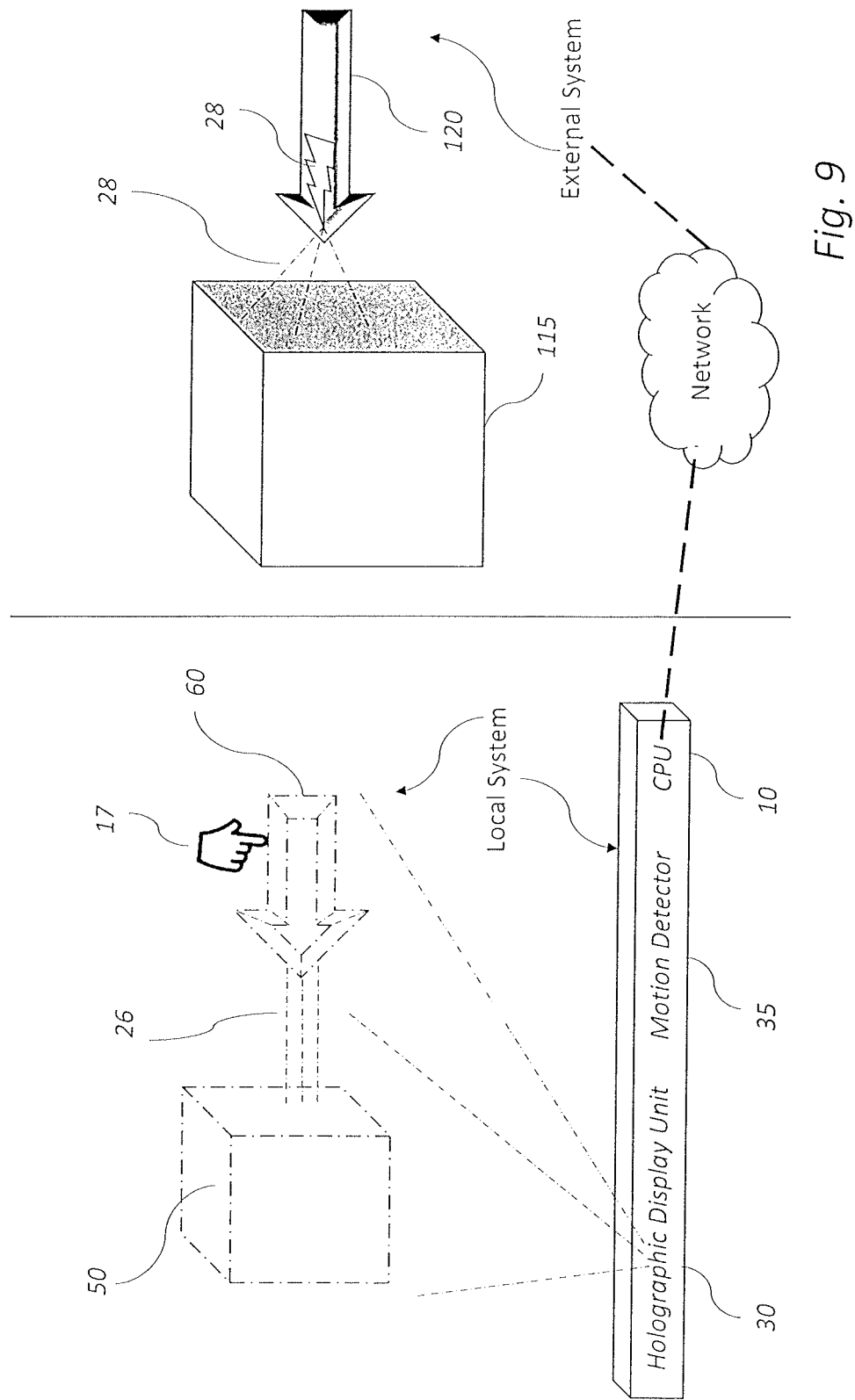
FIG. 9 is an environmental, perspective view of an alternative embodiment of an H2CI according to the present invention showing virtual representations of physical controls, sensors for proximity of physical objects to each other, and virtual objects emitting and detecting EMR.

FIG. 6 shows the overall context for interactive holographic human-computer interface (H2CI). The H2CI uses a combination of software and hardware components to track the motion, type of motion, location, and dwell time of a Command Object relative to a displayed hologram. This allows the H2CI to distinguish, in realtime, without human intervention, intended from unintended motions as well as which of multiple displayed holograms is of interest to a Command Object controlled by the user (e.g., FIGS. 3 and 5). Further, emission and detection of EMR would permit the exchange of information among virtual objects and/or the Command Object, in addition to their proximity to each other or beyond the physical capacity of the motion detector configuration, independently of the motion detector (FIG. 9).

Figure 7:
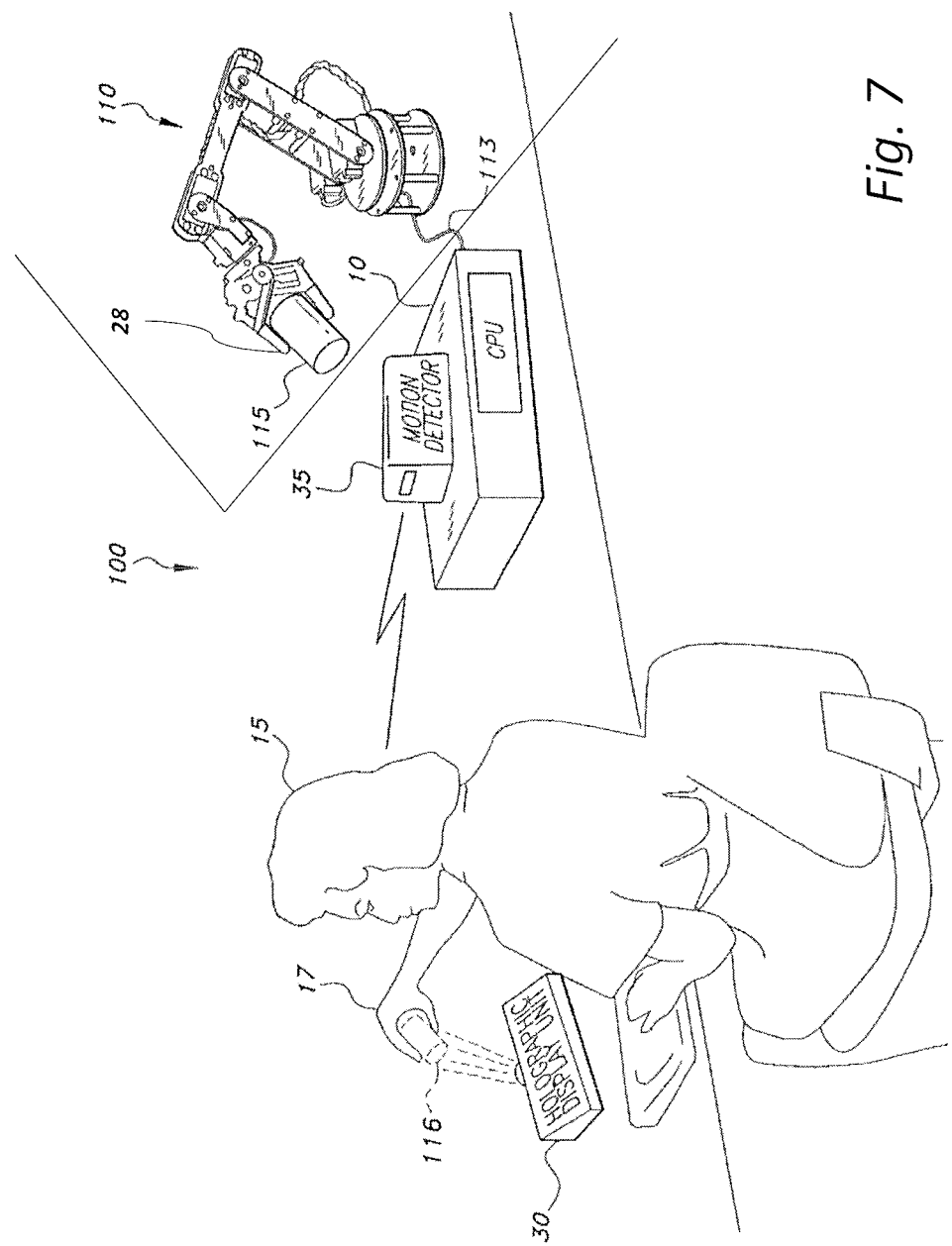
FIG. 7 is an environmental, perspective view of an alternative embodiment of an H2CI according to the present invention showing a local system linked to a robotic external system

FIG. 7 shows one embodiment of a local system, the H2CI, connected to a single external system 110, the robotic arm, located locally or remotely (FIG. 6). As shown in FIG. 7, the H2CI of the local system 100 operates in a manner similar to the prior art system described above and shown in FIGS. 2 and 3, including holographic display unit 30, motion detector 35 and CPU 10. However, the CPU further communicates with an external system 110. In the example shown in FIG. 7, the external system 110 (depicted by the unnumbered angled, diagonal lines) is a conventional robotic arm gripping a physical object, aided by sensors 28 (FIG. 7), e.g., a cup 115. The holographic display unit 30 projects a holographic image 116, representative of the physical object 115, and the user's hand serves as the Command Object 17, as described above, to manipulate the holographic image 116. The CPU 10 interprets motion, type of motion, location, and dwell time of the Command Object 17 (i.e., the user's hand) with regard to the holographic image 116, as described above with relation to FIG. 7, to transmit a command signal to the robotic arm 110 for real, physical manipulation of the physical object 115. A sensor 28 (FIG. 7) in the physical robotic arm 110 determines whether it is moving toward the physical object 115 at the same angle and at the same distance as the Command Object 17 relative to the holographic image 116 (FIG. 7).

The hologram may also be a representation of the physical controls (virtual controls) of the external system (or a simulation thereof) rather than a representation of the physical object to be manipulated as with image 116. For example, the holographic image 116 being manipulated by the Command Object 17 FIG. 7 may represent a physical control, e.g., a joy stick in a plane, a wheel for steering a vehicle or controlling a valve, a button(s) and/or a switch(es) on a remote control panel, or other physical control of the external system FIG. 6. In FIG. 1 and FIG. 7, the CPU 10 is shown as being in communication with robotic arm 110 by a wired line or Ethernet cable 113. However, it should be understood that the CPU 10 may transmit control signals to and receive feedback signals from the external system 110 by any suitable transmission path, including wired or wireless transmission. Wireless transmission would allow connection to remote external systems, as shown in FIGS. 6 and 9.

It should be understood that the external system may include any suitable external computer, computer system or the like, possibly embedded in the external system, for interpreting control signals and delivering control commands to an external system or, alternatively, for interpreting control signals to a computerized simulation of an external system.

In addition to tracking the proximity of Command Object 17 to a displayed hologram and determining actions to be performed on the displayed hologram with motion detector 35, emission and detection of EMR by displayed holograms would allow the exchange of information among displayed holograms and/or the Command Object, without the motion detector. In FIG. 9, Virtual Control 60 is in communication with Physical Control 120, the control for an external system. Virtual Target 50 represents Physical Target 115. As the Command Object 17 moves the virtual Control 60 toward any part of the virtual Target 50, the Physical Control 120 moves the external system toward that same part of the Physical Target 115 (i.e., direct control). CPU 10 and Holographic Display Unit 30 enable the virtual Control 60 to detect EMR 26 from the virtual Target 50 and virtual Target 50 to emit previously coded and stored EMR 26. This EMR describes details of the Physical Target 115 to the external system via Physical Control 120. In the case of a Physical Control 120 for a robotic external system (e.g., 110 in FIG. 7), these details could describe to the external system how much pressure to apply in manipulating the Physical Target 115.

The H2CI of the local system 100 controls CPU 10 in a manner similar to a conventional computer interface (monitor, keyboard, mouse, etc.), exchanging interface command signals with the CPU 10. The CPU 10 then, in turn, may transmit command and control signals to an external system. It should be understood that the external system may be any type of external system or computer system, as will be described in greater detail below.

In addition to motion detection, it should be understood that any suitable type of auxiliary control interface, as is conventionally known, may be integrated into the system, such as speech or voice recognition hardware and/or software; conventional computer interfaces such as keyboards, mice, etc.; wireless remote-control signals, or the like. Thus, auxiliary control signals by any additional type of controller or interface may also be used and transmitted to the external system.

Figure 8:
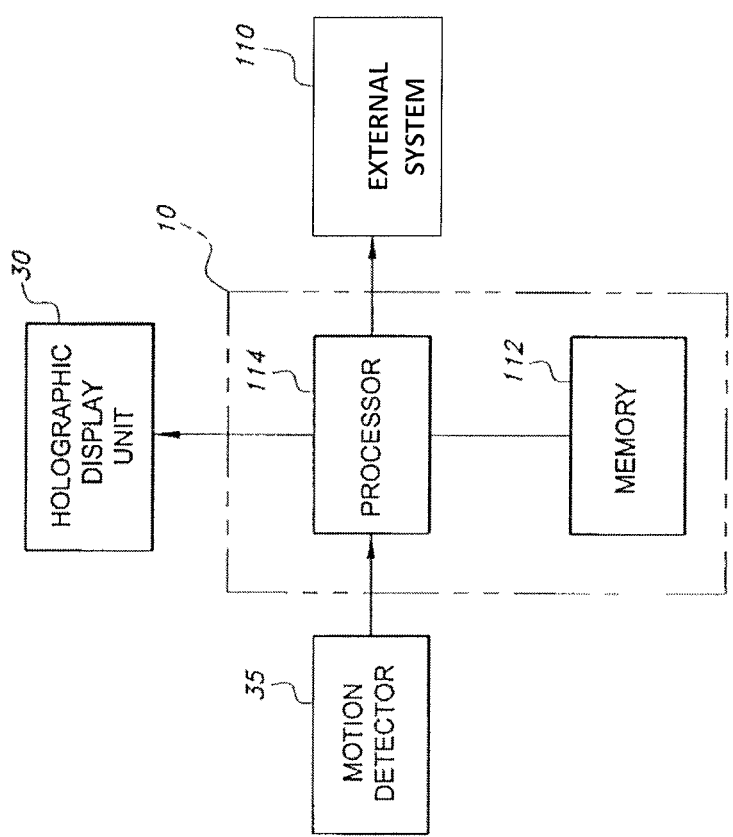
FIG. 8 is a block diagram illustrating system components of an alternative embodiment of an H2CI according to the present invention.

It should be understood that the CPU 10 may be part of or replaced by any suitable computer system or controller, such as that diagrammatically shown in FIG. 8. Data is entered via the motion detector 35 communicating with the CPU 10, as described above, and may be stored in memory 112, which may be any suitable type of computer readable and programmable memory, which is preferably a non-transitory, computer readable storage medium. Calculations are performed by a processor 114, which may be any suitable type of computer processor. The processor 114 may be associated with or incorporated into any suitable type of computing system, for example, a personal computer, a programmable logic controller, or a smart phone or watch. The motion detector 35, the processor 114, the memory 112, the holographic display unit 30, the external system 110 (local or remote environment), and any associated computer readable recording media are in communication with one another by any suitable type of data bus or wireless communication as is well known in the art and are shown as separate physical components for explanatory purposes; they probably would be integrated at least at the platform level. Any processing capabilities not included in the Holographic Display Unit or the Motion Detector are included in the term "CPU," whether physically part of the CPU or physically separate. The emission and detection of EMR by holograms would allow exchange of information among displayed holograms and/or the Command Object, without the motion detector. Emission and detection of EMR would be accomplished through the CPU 10 and the Holographic Display Unit 30 (FIG. 9).

Examples of computer-readable recording media include non-transitory storage media, a magnetic recording apparatus, an optical disk, a magneto-optical disk, and/or a semiconductor memory (for example, RAM ROM, etc.). Examples of magnetic recording apparatus that may be used in addition to memory 112, or in place of memory 112, include a hard disk system (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

It should be understood that the robotic arm shown in FIG. 7 is shown for exemplary purposes only, and that the interactive H2CI of the local system 100 may be used to control any external system, which may include any other type of machinery and/or process, or a system into which the H2CI is embedded, such as power plants, processing plants, planes, ships, vehicles, or external software systems (such as simulations), either remotely or locally located (FIG. 6). replacing, as appropriate, physical controls (e.g., levers, buttons, dials, and wheels) with holographic representations. As an example of such replacement, FIG. 6 illustrates the local system (100 in FIGS. 1, 5, and 7), with all of its components deployed with a variety of external systems, connected locally to an external system or systems or connected remotely to an external system or systems.

It is further contemplated that local system 100 could be embedded into an external system. Holographic images could represent various desired physical controls (virtual controls) for the external systems (e.g., rather than the cup represented by 116), such as levers, wheels, switches, or flat-panel monitors, or other objects. As shown (FIG. 7 and FIG. 9), the user may use his or her hands in a conventional manner, so that the hands serve as the Command Objects 17 such that the motion detector 35 or emission and detection of EMR 26 will detect the user's conventional movements with respect to the holographically represented physical object 116 (e.g., the cup or a control). Haptic feedback would allow the user to detect that contact was made with the virtual control.

As depicted in FIG. 9, the above noted feedback would be an example of using EMR 26 emitted from the hologram and detected by a haptic device on the user's hand. Such feedback could also eliminate the need for a motion detector 35. Virtual reality applications are another example of an application that could use the emission and detection of EMR 26 by the projected holograms. In FIG. 9, emission and detection of EMR 26 would be accomplished through the CPU 10 and the Holographic Display Unit 30. The motion detector 35 transmits the received motion signals to the CPU 10, which may be mounted in any suitable location for transmitting control signals to the external system 110, located remotely or locally. The CPU 10 may discriminate between general motions made by the Command Objects 17 (i.e., the user's hands in this example) and motions specific to the physical control represented by the hologram. For example, if the hologram 116 represented a wheel to be used for manipulating the robotic arm 110 and the user made back-and-forth linear motions with his or her hands, the CPU 10 would not interpret this as wheel-related and will not transmit a control signal to the external system 110. The CPU 10 can be programmed to only interpret clockwise or counter-clockwise rotational movement of the user's hands as wheel-related, and only transmit a control signal when such motion is detected by the motion detector 35 or emission and detection of EMR, for example. This discrimination is done under computer control (CPU 10), automatically, in realtime, without human intervention. That is, the type of motion (intended motions specific to the control or unintended general motions to be ignored) is tracked by the motion detector 35 or emission and detection of EMR 26 and interpreted by the CPU 10. Note that the wheel is only an example of a control that could be replaced by a hologram. Any other controls or combination of controls could as well be replaced, as described below. The type of motion interpreted as intended would depend on the type of control represented by the hologram. A virtual lever, for example, would only accept a forward or backward movement of a minimum distance and duration.

It should be understood that figures only illustrate an exemplary use of the local system 100 with the interactive holographic human-computer interface (H2CI), and that the H2CI for local system 100 may be used as an interface for any suitable system, either external or the local system itself. In a more complex exemplary system, such as a fighter jet, the local system running the H2CI would be embedded in a fighter jet. The holographic display unit 30 could be used to project virtual fighter jet controls to be manipulated by the user, as well as heads-up holographic information. The CPU 10 may be in communication with information systems associated with the jet, such as radar signal processing systems and the like. It should be understood that in addition to actual, realtime control, the H2CI for local system 100 may also be used in conjunction with a mock-up for purposes of training or simulation.

It should be further understood that there are exemplary applications involving infectious or other hazardous materials or implements (e.g., diseases, chemicals, needles, proximity to high voltage or heat, or sharp edges), in a wide range of areas such as medical, scientific, mining, or industrial processes, where the materials or implements could be handled through virtual representations of physical controls to improve safety for operators, reduce contamination of the materials or controls, or reduce costs for skilled operators (FIG. 9) by allowing remote operation. Robotic assistance would be included as appropriate. Holographic representations of the controls on related equipment could further improve safety and reduce costs for skilled operators who could use holographic representations of controls for remotely located equipment.

Figure 2:
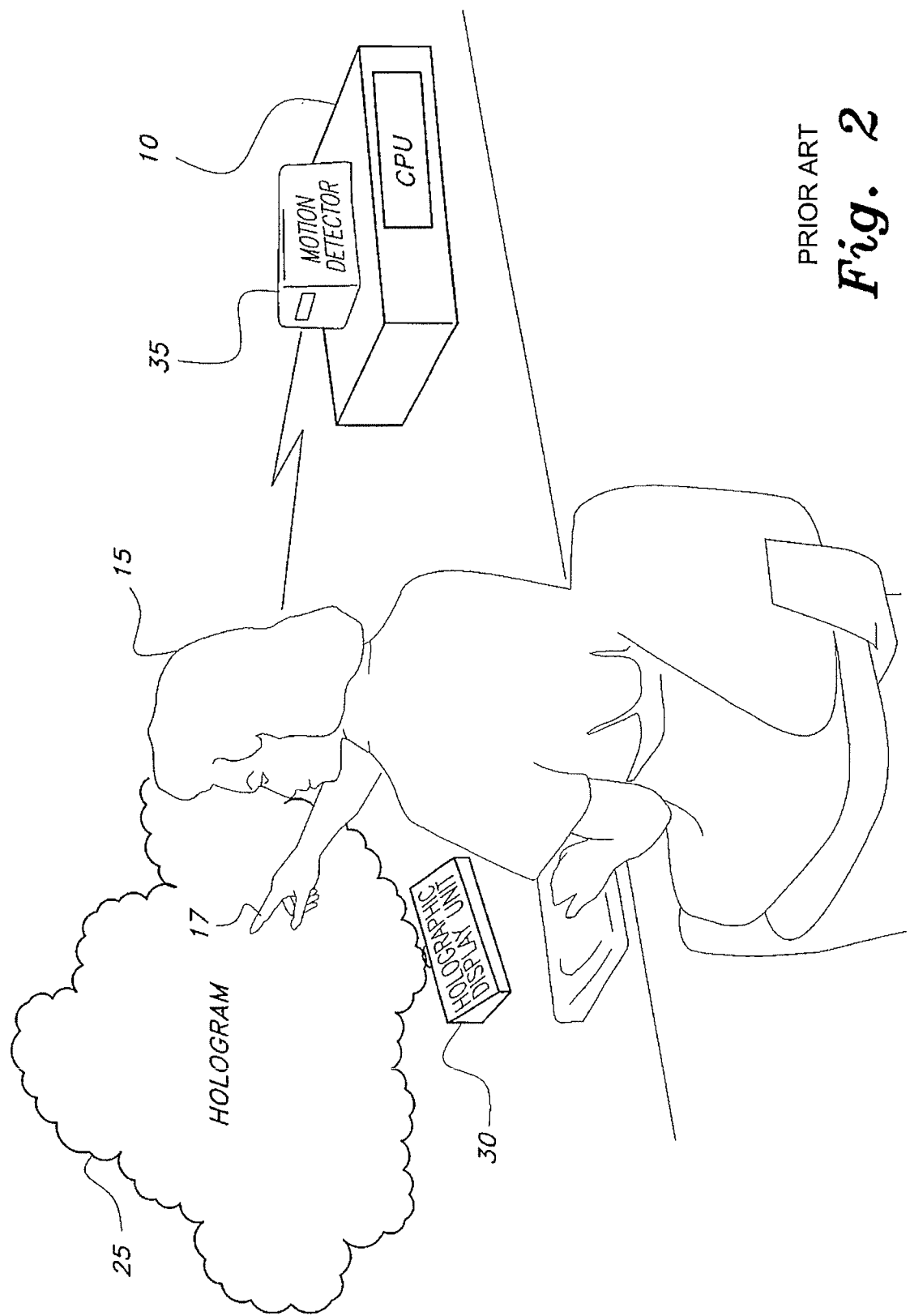
FIG. 2 is an environmental, perspective view of a prior art holographic interface system.
Figure 3:
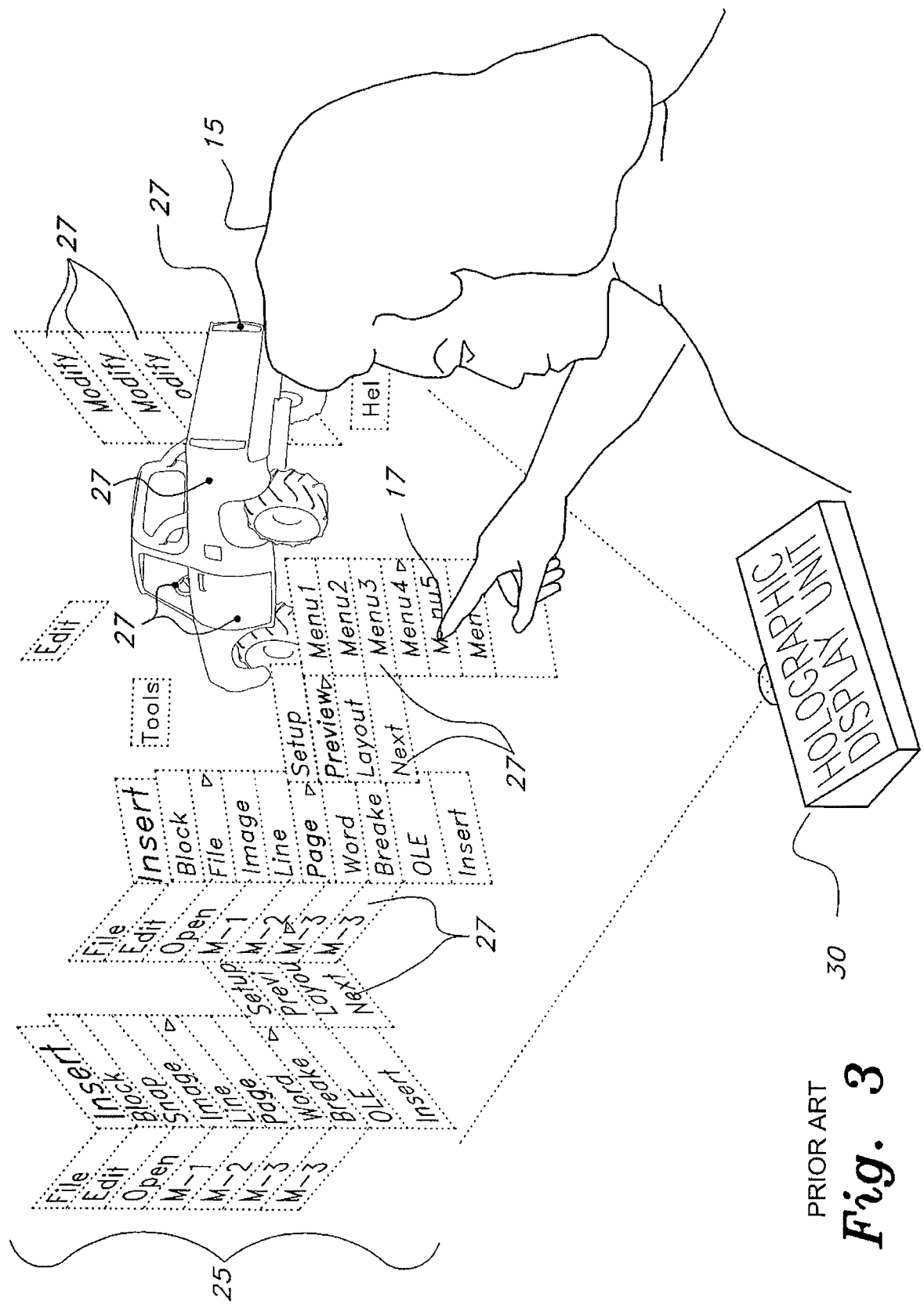
FIG. 3 is an enlarged view of the prior art holographic interface system of FIG. 2.

In a related exemplary application, the results of genome resequencing could be used directly in realtime to build or modify holographic representations of a genome, using holographic representations of the results from robotic resequencing equipment connected to components equivalent to 30 and 35, or EMR 26 in lieu of 35, in FIGS. 2, 3, and 9. This could be two way—holographic sequencing components could be used with virtual controls to analyze the holographic genome for further sequencing using EMR emission and detection. Holographic display of genomes would be useful in analyzing the structure as well as the function of the genome. The emission and detection of EMR by holograms would allow exchange of information among displayed holograms and/or the Command Object without the motion detector. Emission and detection would be accomplished through the CPU 10 and the Holographic Display Unit 30 (FIG. 9).

It should be further understood that the H2CI for local system 100 is not limited to the control of external systems, but may also be used as a direct interface for a computer, computer system, computer network or the like. The H2CI for local system 100 allows the user to interact with holograms of objects of interest directly, for viewing, arranging for design purposes, editing and the like, particularly for applications running on the local system, including conventional computer applications, simulations and the like. Such control of conventional computer applications would allow the user to manipulate virtual controls and objects for the local system as well as virtual controls and objects for external systems, whether locally or remotely located, through the same interface (FIG. 6).

Further, the H2CI for local system 100 provides the user with the capability to directly manipulate holograms that represent controls on systems, whether physical or not, that are external to the computer (external systems) using the interface (local system). For example, in FIG. 7, the user is not manipulating a hologram of the robotic arm 110 (external system), but is rather manipulating a hologram 116 of the object 115 being manipulated by the robotic arm. The Command Object, the user's hand, is being tracked by motion detector 35, which is sending signals through the CPU (in realtime, without human intervention) to the external system 110, causing the robotic arm to move. Sensors 28 on the robotic arm 110 (FIG. 7) provide feedback regarding its position relative to the object 115. This is one use of the local system 100 in controlling an external system 110. It should be further understood that the external system may be another computer or computerized system, such that the external control corresponds to external software control, thus forming a remote H2CI for the remote computer or computerized system.

It should be further understood that the remote external system, such as the exemplary robotic arm 110 of FIG. 7 or the physical control 120 of FIG. 9, may include sensors 28, transmitters or any other necessary or desired auxiliary or peripheral equipment, or may be in communication with such at the remote location. Using the example of FIG. 7, as the user's hand 17 moves toward the hologram of the object 116, the robotic arm 110 moves toward the actual object 115. In addition to having the local system 100 track the relative location of the user's hand 17 with respect to the hologram of the object 116 via 35 and the pressure of the user's hand on 116 via EMR detection and emission 26 FIG. 9, additional external sensors 28 (FIG. 7 and FIG. 9) may be used to track the position of the robotic arm 110 relative to the physical object 115, as well as translating the hand movements into actual physical pressure on the object 115. The addition of sensors as described in the foregoing is exemplary and would apply to any system for which such control was desired, as in remote operation of robotic system, remote operation of construction equipment, or remote operation of transport systems (FIG. 9).

It should be further understood that feedback from external systems may be displayed in hologram 25 (as in, for example, FIG. 3). An exemplary scenario, in a nuclear power plant, notification of abnormal conditions such as overheating may be displayed as a hologram of the affected component, with accompanying audio, textual, and/or visual cues to draw attention to the problem, including recommended corrective action. Such feedback would be especially useful in complex environments such as the control center of a nuclear power plant, a plane, or a ship where multiple abnormal conditions may appear at the same time.

In the above example of a nuclear power plant, when a component is detected to be outside normal parameters it must be dealt with immediately. As was discovered with Three Mile Island, when one component fails it may start a cascade of failing components. Interpreting the multiple alerts may require more time than is safe for prioritizing and responding, as happened with Three Mile Island. Displaying holograms of failing components, including their physical location relative to each other, with audio, textual, and/or visual cues to indicate priority and corrective action alleviates the problem. In current displays, displaying such complex information requires multiple flat screens and limits an integrated display of the failing components with related cues and actions easily comprehended by operators. Operators using such an integrated interactive holographic display are able to respond by touching the displayed hologram as indicated by the cue accompanying the hologram of the failing component. Feedback using EMR could be used to confirm the touch. Further, virtual controls may be displayed for each failing component to allow the operators to take corrective action using the familiar controls for the component. This means that properly interpreting the touch (i.e., type of motion) is crucial, so that unintended touches (motions) are distinguished under computer control, automatically, in realtime, without human intervention. The hologram of the failing component (as represented by 50 in FIG. 9) may be displayed in its actual size or scaled for convenience, including controls (levers, buttons, wheels, or replicas of physical flat screen displays as represented by 60 in FIG. 9) used for controlling the physical component.

It is to be understood that the present invention is not limited to the embodiments described above, but encompasses any and all embodiments within the scope of the following claims.

I claim:

1. An interactive holographic human-computer interface (H2CI), comprising:
    a local system, wherein the local system is in communication with an external system;
    a holographic display unit for constructing and displaying one or more holograms, wherein the one or more displayed holograms emit electromagnetic radiation;
    a motion detector for detecting motion, type of motion, dwell time, and location of a physical command object relative to the one or more displayed holograms;
    sensors on the external system to determine the location of two or more physical objects relative to each other;

a central processing unit, the central processing unit including a controller in communication with the motion detector for converting the detected location of the physical command object relative to its position with respect to the displayed hologram into a command signal when the command object is at or near a command point in the hologram for a predetermined dwell time and performs a predetermined type of motion corresponding to a contact code;

emission and detection by the one or more displayed holograms of electromagnetic radiation to simulate electrical, vibration, or other physical phenomena characteristic of the physical objects represented by the one or more displayed holograms, converting the electromagnetic radiation emitted by the one or more displayed holograms into a command signal when the electromagnetic radiation is detected by another hologram; and means for transmitting the command signal to the local system or the external system controllable by the command signal, automatically, under the control of the central processing unit.

2. The H2CI as recited in claim 1, wherein the one or more holograms visually represent a control interface, including detection and emission of electromagnetic radiation, associated with the external or local system.

3. The H2CI as recited in claim 1, wherein the one or more holograms visually represent at least one object being manipulated for the local or external system.

4. The H2CI as recited in claim 1, wherein the one or more holograms visually represent at least one physical control, including detection and emission of electromagnetic radiation, associated with the control interface of the external or local system.

5. The H2CI as recited in claim 1, wherein the one or more holograms represent physical objects with their physical attributes simulated by emission of electromagnetic radiation and at least one hologram represents an instrument that detects the electromagnetic radiation.

6. The H2CI as recited in claim 1, further comprising an auxiliary control interface for transmitting auxiliary control signals to the external system.

7. A method of controlling a system by holographic interface, comprising the steps of:
    displaying one or more holograms;
    detecting motion, type of motion, dwell time, and location of a physical command object relative to the one or more displayed holograms;
    processing the detected motion, type of motion, dwell time, and location of the physical command object relative to the one or more displayed holograms;
    converting the processed motion, type of motion, dwell time, and location of the physical command object into a command signal when the command object is at or near a command point in the one or more displayed holograms and performs a contact code or a manipulation of a physical control represented by the one or more displayed holograms;
    emitting and detecting by the one or more displayed holograms or the command object, electromagnetic radiation simulating electrical, vibration, or other physical phenomena characteristic of the physical objects represented by the one or more displayed holograms or the command object;
    converting the electromagnetic radiation emitted by the one or more holograms or the command object into a command signal when the electromagnetic radiation is detected by another of the one or more holograms; and
    transmitting the command signal to an external system controllable by the command signal.

8. The method of controlling a system by holographic interface according to claim 7, the method further comprising the steps of:
    providing at least one of the one or more holograms representing a holographic image of a physical control for the external system, capable of emitting and detecting electromagnetic radiation, including holographic representations of flat screen displays or any component of the external system;
    determining whether the motion is intended or unintended;
    detecting the manipulation of the physical control, including detection and emission of electromagnetic radiation;
    determining the presence of electromagnetic radiation;
    manipulating the holographic image of the physical control of the external system;
    generating a command signal commanding the external system to perform an action corresponding to manipulation of the physical control, wherein the command signal includes the detection and emission of electromagnetic radiation; and
    transmitting the command signal to perform an action to the external system, the external system performing the action after receiving the command signal.

9. The method of controlling a system by holographic interface according to claim 8, wherein the external system is a robotic device.

10. The method of controlling a system by holographic interface according to claim 8, wherein the external system is selected from the group consisting of power plants, processing plants, planes, ships, vehicles, or local or external software systems including simulated systems.

11. The method of controlling a system by holographic interface according to claim 8, further comprising the steps of:
    receiving an auxiliary command;
    generating an auxiliary command signal commanding the external system to perform an action corresponding to the auxiliary command; and
    transmitting the auxiliary command signal to perform the action to the external system, the external system performing the action after receiving the auxiliary command signal.

12. A method of controlling an external system by holographic interface, comprising the steps of:
    providing an external system;
    displaying one or more holograms;
    detecting motion, type of motion, dwell time, and location of a physical command object relative to a displayed hologram;
    processing a contact code based on the detected motion, type of motion, dwell time, and location of the physical command object;
    converting the processed contact code into a command signal;
    emitting and detecting by the displayed holograms electromagnetic radiation simulating electrical, vibration, or other physical phenomena characteristic of the physical objects represented by the displayed holograms;

converting the electromagnetic radiation emitted by the one hologram into a command signal when the electromagnetic radiation is detected by another of the one or more holograms; and transmitting the command signal to the external system in real-time, without human intervention.

13. The method of controlling an external system according to claim 12, wherein at least one hologram represents a holographic image of physical controls of the external system, the method further comprising the steps of:

manipulating the holographic image of one of the physical controls of the external system, including by detection of electromagnetic radiation;

determining whether the motion is intended or unintended;

detecting the manipulation of the physical control;

generating a command signal commanding the external system to perform an action corresponding to manipulation of the physical control; and transmitting the command signal to perform the action to the external system, the external system performing the action after receiving the command signal.

14. The method of controlling an external system according to claim 13, wherein the external system is a robotic device.

15. The method of controlling an external system according to claim 13, wherein the external system is selected from the group consisting of power plants, processing plants, planes, ships, vehicles, or local or external software systems including simulated systems.

* * * * *